Jan. 14, 1969 G. H. BOWSER 3,422,168
PROCESS OF CASTING RESINOUS LENSES IN
THERMOPLASTIC CAST REPLICA MOLDS
Filed Dec. 1, 1964 Sheet 1 of 3
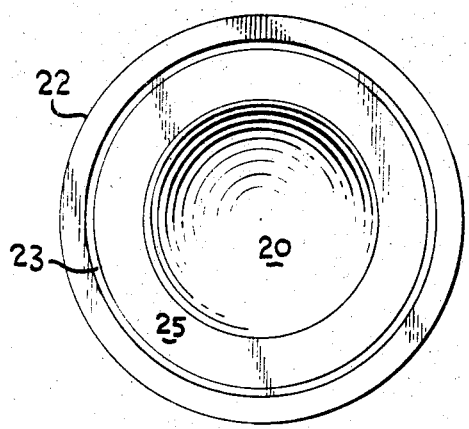
FIG. 1
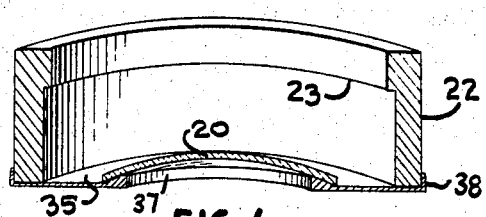
FIG. 6
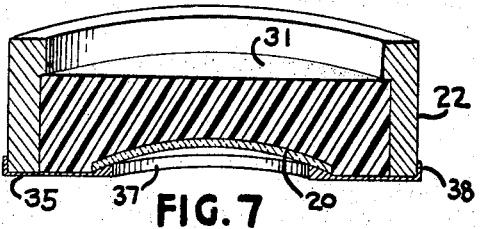
FIG. 7
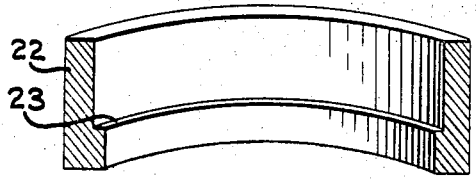
FIG. 2
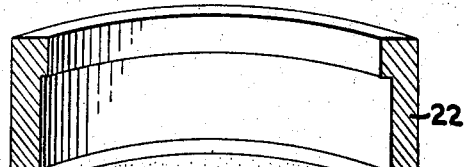
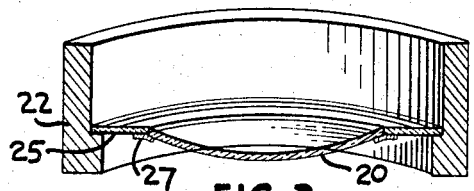
FIG. 3
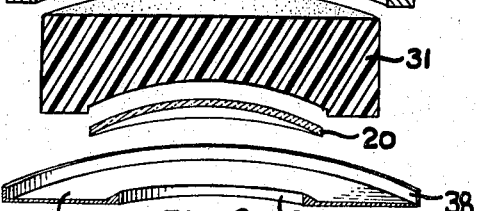
FIG. 8
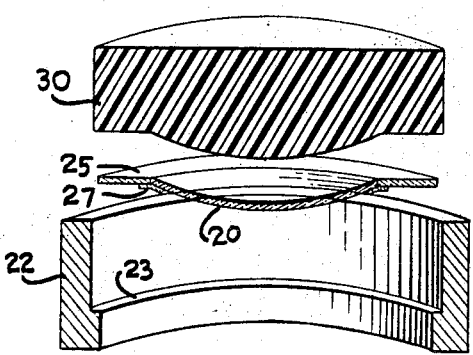
FIG. 4
FIG. 5
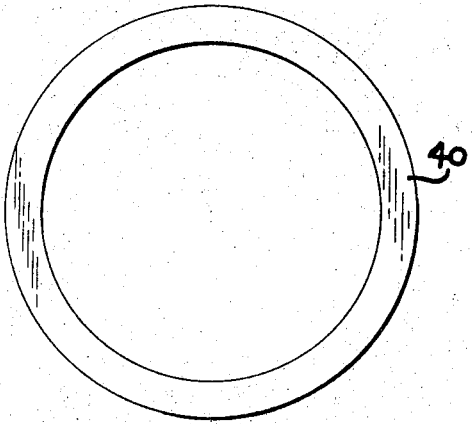
FIG. 9
INVENTOR
GEORGE H. BOWSER
Chisholm and Spencer
ATTORNEYS

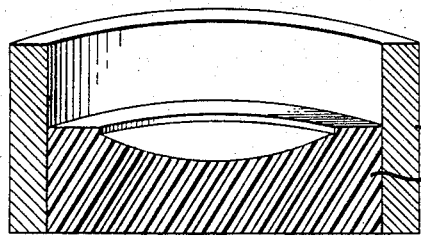
FIG. 10
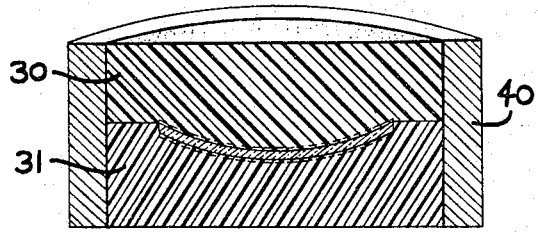
FIG. 11
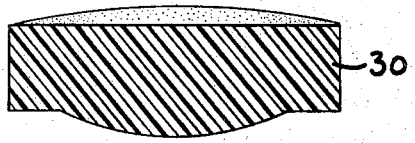
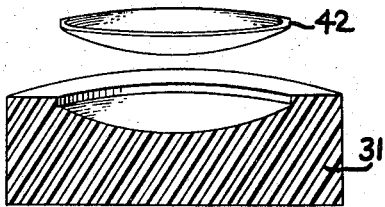
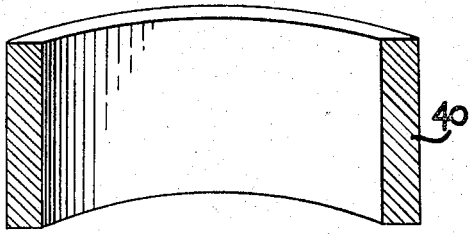
FIG. 13
FIG. 12

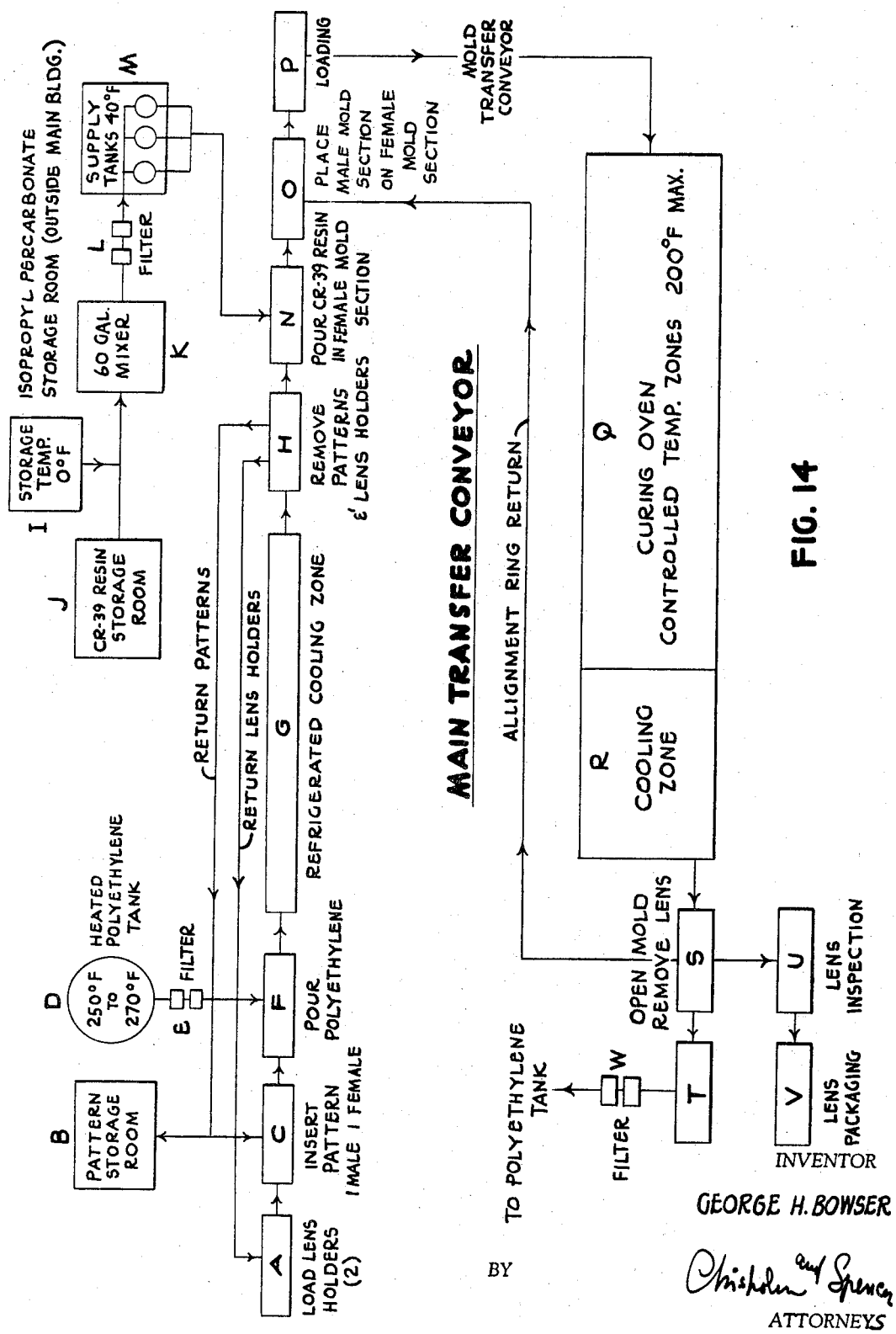

United States Patent Office 3,422,168
Patented Jan. 14, 1969

3,422,168
PROCESS OF CASTING RESINOUS LENSES IN THERMOPLASTIC CAST REPLICA MOLDS
George H. Bowser, New Kensington, Pa., assignor to PPG Industries, Inc., a corporation of Pennsylvania
Filed Dec. 1, 1964, Ser. No. 415,055
U.S. Cl. 264—1                9 Claims
Int. Cl. B29d 11/00

ABSTRACT OF THE DISCLOSURE

The present invention relates to a novel method for producing plastic optical and ophthalmic lenses. The novel method of this invention is utilized to produce thermosetting resinous articles such as optical lenses by producing a replica mold from a master pattern of the article by casting a thermoplastic resinous material about the master pattern. A thermosetting resinous material may then be introduced into the replica mold and thereafter cured by heating the filled mold to a temperature above the curing temperature of the thermosetting material but below the softening temperature of the thermoplastic mold. The novel method of this invention is particularly adapted for producing plastic lenses of a thermosetting resin comprising allyl diglycol carbonate. Thermoplastic mold materials which are found particularly useful are low molecular weight polyolefin resins such as polyethylene.

---

A plastic lens is conventionally manufactured by casting a thermosetting resin in a rigid glass mold. Typical processes are described in U.S. Paents Nos. 2,542,386, 2,964,501 and 3,038,210. The mold consists of two glass mold sections separated by a flexible, compressible gasket. These sections have opposing ground and polished curved surfaces which form a cavity for forming the lens.

This process requires a careful assembly of the sections and the flexible gasket. The cavity is then filled with the resin and the filled mold is subjected to heat to cure the resin in the mold. This may be done by injecting a metered amount of the curable resin between the mold sections to fill the cavity formed between the mold sections.

The resin shrinks during curing. The shape of the lens is such that virtually all of the shrinkage occurs in the thickness dimension and virtually none in the other dimensions. The flexible gasket permits the rigid mold halves to follow through on the shrinking plastic lens during curing. In the process shown in U.S. 2,542,386, the mold sections are clamped together under pressure during the curing cycle of the resin in order to maintain contact of the mold halves with the resin during curing and help follow-through during shrinkage. In the patented processes referred to above, the resin cures to form the replica surface of the glass mold.

Glass molds are expensive to fabricate because the surfaces in contact with the resin must be optically ground and polished to permit the production of the desired curvature of the finished lens. A relatively long curing time (between 8 and 36 hours) is required to cure the resins conventionally used. The lens manufacturer is therefore forced to maintain a large inventory of duplicate master glass molds to produce a large number of lenses of the same curvature at the same time. When one considers the mold set-up time, the time involved in opening the molds and the time required to clean the molds in preparation for their re-use, in addition to the curing time, it is readily seen that a single mold averages less than one trip per day through a typical manufacturing cycle for an 8-hour working day. It is estimated that a plastic lens manufacturer, who produces a plurality of different lenses, must maintain an inventory of 500,000 glass molds to produce approximately 25,000 plastic lenses daily. In addition, it is estimated that over 500 glass molds must be manufactured each day to replace those lost through accidental breakage and deterioration.

In accordance with the present invention, plastic lenses can be manufactured inexpensively without the need for a precision, two-part, ground and polished glass mold, without clamping the parts of the mold together, and without a compressible gasket between the mold halves during curing of the resin. This is accomplished by thermally curing the resin in a two-part, thermoplastic resinous mold instead of a glass mold. The thermoplastic mold is easily and inexpensively melted and reformed after each lens is cast, thereby eliminating the need for a large inventory of molds. The only inventory required is that of the master lenses used to make the thermoplastic molds.

The method of the present invention begins with a master lens of substantially the same curvature as the plastic lens which is to be produced. A two-part (male and female) replica mold for the master lens is then made using a wax-like, thermoplastic resinous material to form the two mold sections. The melting temperature of the mold material is above the curing temperature of the resin forming the lens, preferably about 10° to 50° F. above the highest temperature employed in curing the resin.

A metered amount of the liquid, curable, thermosetting resin is next poured into the female section of the replica mold. The male section of the mold is positioned over it and in contact with it to complete the mold and force the resin throughout the cavity formed by the two sections of the mold. The mold sections, when assembled, form a cavity conforming to the master lens. This cavity has the desired curvature of the final product, but is greater in thickness than the final product to allow for the shrinkage of the resin during curing.

The filled mold is then heated to cure the resinous lens material. During the initial portion of the heating, the resin starts to polymerize and adhere to the mold surfaces. As it is further cured, the temperature is raised and the resin begins to shrink and harden. As the temperature is raised, the thermoplastic mold material expands slightly and softens to follow the contour of the shrinking lens. When the resinous lens is sufficiently cured, the assembly is cooled to handling temperature, the mold sections are separated and the finished lens is removed.

The thermoplastic mold contracts slightly during cooling and can be separated from the finished lens without damaging the surface of the lens. The mold sections are then melted and reformed into new sections to repeat the above procedure.

A unique characteristic of the present invention is that the thermosetting resin material used to fabricate the lens and the thermoplastic resin used to fabricate the replica mold are carefully chosen to be a matched pair. The thermoplastic resin used to make the replica mold is selected to be relatively rigid during initial curing of the thermosetting resin in order to obtain the smooth face and proper curvature and progressively soften after the initial cure as the thermosetting resin used to make the lens is further cured and hardened. This match of the two resins permits the mold to retain its shape during the initial portion of the cure cycle and thereafter to follow the curvature of the shrinking plastic lens. The automatic follow-through of the mold on the shrinking lens prevents the separation of the mold and the lens from taking place. The mold follow-through and adhesion of the mold to the lens permit the desired finished curvatures of the lens to be maintained without the need for a flexible gasket between the male and female sections of the mold or for a clamping means to hold the mold sections together during the cure cycle.

It is believed that the follow-through capabilities exhibited by the matched pair of resins of the present invention is due to a combination of two factors. The first of these is that as the temperature of the replica mold is increased, the mold tends to soften somewhat to relieve the stresses which may exist between the contracting surfaces of the lens and the expanding replica mold surfaces. The second is that as the temperature of curing increases, there is a slight volume expansion (i.e., about 1 to 5 percent) of the thermoplastic mold material. The exact proportion and degree to which each of these two variables affect the follow-through of the mold on the shrinking lens is not at the present time fully determinable. It is theorized, however, that the majority of this follow-through phenomenon is due to the adhesion of the thermosetting resin to the mold and to the softening of the replica mold material.

To better understand the method of the present invention, reference may be had to the accompanying drawings, in which:

FIG. 1 is a top view of a mounting ring with a master lens supported for casting of a section of the thermoplastic mold;

FIG. 2 is an elevation, partially in section, of the mounting ring;

FIG. 3 is an elevation, partly in section, of the master lens supported within the mounting ring;

FIG. 4 shows the master lens and the mounting ring to which has been added the thermoplastic resinous mold material to form the male mold section;

FIG. 5 illustrates the assembly of FIG. 4 after removal of the male mold section and master lens;

FIG. 6 shows the mounting ring inverted from its position in FIGS. 1 to 5 with the master lens positioned preparatory to forming the female mold section;

FIG. 7 shows the master lens and the mounting ring to which has been added the thermoplastic mold material;

FIG. 8 shows the separation of the master lens from the cast female mold section;

FIG. 9 is a top view of an alignment ring;

FIG. 10 shows the placement of the female replica mold section in the alignment ring;

FIG. 11 shows the female mold section in the alignment ring to which a measured amount of liquid, curable, thermosetting resin has been introduced;

FIG. 12 shows the male section of the replica mold in place upon the female section of the replica mold, all within the alignment ring after curing of the resin;

FIG. 13 shows the separation of the male and female replica mold sections from the finished cured plastic lens; and FIG. 14 is a flow chart of an automated assembly line capable of high volume, mechanized production of plastic lenses according to this invention.

The following is a detailed example which represents the best mode contemplated by the inventor for carrying out the present invention.

Example I

A ground and polished glass lens 20 was selected as the master lens. The prescription of the single vision uncut master lens was plus 2.00±0.06 dioper, 55 millimeters diameter. The resin selected to constitute the finished lens was allyl diglycol carbonate, hereinafter referred to as CR–39 resin. CR–39 is a registered trademark of Pittsburgh Plate Glass Company for this type of resin.

In a glass beaker, 193.4 grams of the CR–39 resin was placed, to which 6.6 grams (3.3 percent) of diisopropyl peroxy dicarbonate was added as a catalyst. Anhydrous sodium sulphate (2 grams) was added to the catalyzed CR–39 resinous solution to remove any moisture present. The resultant mix was then filtered through a Buchner funnel using No. 1 filter paper, filtering flask and 28 inches of vacuum. The catalyzed CR–39 resin was then stored at 40° F. until used to make the lens.

A mounting ring 22 fabricated from aluminum in the shape of a ring 3 inches in outside diameter and 1 inch high with a wall thickness of $3/16$ inch for $3/4$ inch of its height and $1/4$ inch for the remaining height was made. A top view of the aluminum ring is shown in FIG. 1. The variation in wall thickness provided a ledge 23 on the interior of the ring 22.

To manufacture the male half of the replica mold, the master glass lens 20 was positioned in a ring-like lens holder 25 which was $2 5/8$ inches in outside diameter, $2 1/16$ inches in inside diameter, $1/16$ of an inch thick and which had a ledge 27 to center the lens 20. The master lens 20 and the holder 25 were then positioned in the aluminum ring 22 with the convex surface of the master lens 20 facing down as shown in FIG. 3.

About 48 grams of molten polyethylene (Epolene C–12) resin heated to about 250° F. was poured into the aluminum ring 22 containing the mounted master lens 20 thereby completely covering the lens as shown in FIG. 4. Care was taken not to introdce the Epolene C–12 resin directly onto the master lens. Pouring directly onto the center of the master lens sometimes results in the formation of small pits in the surface of the thermoplastic mold thus formed. The aluminum ring was filled by pouring along the edge onto the lens holder 25 and allowing the Epolene C–12 to flow over the master lens as the desired amont of Epolene C–12 was added. The cast Epolene C–12 male mold section 30 and assembly were allowed to set for 10 minutes at room temperature (70° F.). The assembly was then placed in water at 130° F. for 5 to 7 minutes to bring the thermoplastic mold section 30 to a uniform temperature. The thermoplastic material shrinks during cooling and releases from the walls of the ring 22. Then the assembly was separated as shown in FIG. 5.

To manufacture the female section 31 of the replica mold, the master lens 20 was placed on a lens support 35 on a flat work table with the concave surface facing the table. The lens support 35 is in the form of a ring having an inner annular sloped, centering ridge 37 to center the lens 20 and an outer annular ridge 38 to center the mounting ring 22. The mounting ring 22 was inverted and centered around the master lens 20 as shown in FIG. 6. Epolene C–12 (about 43 grams) was poured into the ring 22, again along the edge so as to not introduce the molten Epolene C–12 directly upon the master lens. The ring is only partially filled as shown in FIG. 7 since it is not necessary to fill the mold completely. The cast Epolene C–12 was allowed to set for 10 minutes at room temperature (70° F.) and for 5 to 7 minutes in water at 130° F. as in the manufacture of the male portion 30 of the Epolene C–12 replica mold. The assembly was separated as shown in FIG. 8.

The separation of the thermoplastic mold sections from the master lens 20 was accomplished by using a vacuum cup to grip the master lens. The lens was removed using an eccentric motion to prevent damage to the cast surfaces produced in the mold sections 30 and 31.

The female section of the Epolene C–12 mold was placed in a metal alignment ring 40. This ring is shown in FIGS. 9 to 13.

The alignment ring and female section 31 of the replica mold were then positioned on a flat surface and 8 grams of the previously prepared and catalyzed CR–39 resin were poured into the depression of the female mold as shown in FIG. 11. The male portion 30 of the mold was then carefully placed onto the female portion 31 of the mold as shown in FIG. 12. The filled replica mold was then passed through the following curing cycle in an air circulating oven to cure the plastic lens:

| Time, hrs.: min.: | Temp. ° F. |
|---|---|
| 0:00 | 115 |
| 1:00 | 118 |
| 2:00 | 122 |
| 3:00 | 126 |
| 4:00 | 129 |
| 5:00 | 145 |
| 5:30 | 151 |
| 5:45 | 154 |
| 5:55 | 159 |
| 6:10 | 165 |
| 6:30 | 176 |
| 7:30 | End of cycle |

The dotted lines on the female and male sections 30 and 31 indicate diagrammatically the position of the resin contacting surfaces of the mold sections before curing and the solid line indicates the position of these surfaces after curing. At the end of the curing cycle, the mold was removed and allowed to cool in air for several minutes until it reached approximately room temperature (70° F.).

The mold was then separated by hand and the finished lens blank 42 removed as shown in FIG. 13. The heat during curing of the CR–39 resin is sufficient to cause the mold halves to fuse together. Residual Epolene C–12 on the lens was removed with solvent (VM+P Naphtha). After the lens was removed and cleaned, the lens was inspected and found to be of good optical quality. The plastic lens blank 42 was then cut along the edge to the outline desired for fitting into the spectacle frame. The uncut lens blank thus produced may also be used as a secondary master lens pattern in place of the glass master lens for future lens production rather than being sold to customer.

In the practice of the present invention, the following factors must be controlled: (a) accurate mounting of the master lens in the master lens holder; (b) the temperature and method of introduction of the plastic mold material into the master lens holder; (c) the rate of cooling of the plastic mold material after it has been poured into the master lens holder; (d) the temperature of master lens removal from the plastic mold; (e) the method of master lens removal to prevent marring and distortion of the replica surface of the mold; and (f) the times and temperatures of the lens resin curing cycle to insure satisfactory follow-through of the mold on the shrinking lens.

This last facutor involves the compatibility of the lens shrinkage rate with the rate of softening of the mold material. The curing cycle must insure that the mold is soft during the final critical stages of the lens polymerization cycle to permit the cure of the lens without any surface stress being exerted on the lens due to the inability of the mold to relax and follow through adequately. Although the mold sections soften, they do not adhere strongly to each other mainly because some of the CR–39 resin is squeezed between the meeting portions of the mold sections and serves as a thin, film-like parting material.

If the above factors are adequately controlled, the entire process of producing plastic lenses can be automated to allow for high volume rates of plastic lens production. FIG. 14 shows a plastic lens operation flow diagram for an automated production line for the production of CR–39 lenses.

The production line begins with a source A of master lens holders, in which the master lenses 20 from a master lens pattern storage room, B, are automatically positioned to form the male and female master lens holder mounting at C. A source of liquid Epolene C–12, heated between 250° and 270° F., is located at D. The molten thermoplastic resin passes through a filter E and is poured into the master lens mountings at station F to form the molds. The master lens holders containing the freshly poured Epolene C–12 are then passed through a forced cooling zone G. The cooling cycle described in the example can be utilized or a faster cooling cycle can be employed depending upon the cooling capability of the thermoplastic resin.

At station H the master lenses are separated from the master lens holders producing the male and female halves of the Epolene C–12 mold. Also, at station point H, the master lens holders are returned to the source A of master lens holders in the production line for re-use and the master lens patterns are returned for re-use or to the master lens pattern storage room.

A CR–39 resin source is indicated as J, and a refrigerated source of diisopropyl peroxydicarbonate (isopropylpercarbonate), I, is located preferably outside the building and maintained at 0° F. A mixing stage, K, indicates where the catalyst, isopropyl percarbonate, and the CR–39 resin are mixed. After mixing, the catalyzed CR–39 resin passes through a filter, L, and is introduced into storage supply tanks maintained at 40° F. located at M.

At point N in the production line, the female portion 31 of the mold is placed in the alignment ring 40 and a measured amount of catalyzed CR–39 resin is introduced into the female portion 31 of the mold. The male portion 30 of the mold is then positioned on top of the female mold portion at station O and the mold assembly is transferred to a loading station P for transfer by conveyor into the curing oven. The curing oven, Q, has a controlled time temperature gradient to cure the CR–39 resin. Toward the end of the CR–39 resin curing cycle, the filled mold assemblies pass through a controlled cooling zone in the curing oven labeled R. At point S the mold assembly is opened, the finished CR–39 resin lens 42 is removed and passed to the inspection station U. If found satisfactory by conventional lens inspection, the finished lens is sent to packing stage V. The aluminum alignment ring 40 removed at stage Q is returned to point O for re-use in the production line. The Epolene C–12 mold halves are remelted at stage T, passed through a filter at stage W, and returned to the heated polyethylene storage tank D for re-use. An alternate method of separating the lens from the mold is to melt the assembly while the lens is still in the mold. The liquid mold material is drained off and the lens is cleaned by vapor degreasing or other suitable cleaning method which lends itself to an automated production operation.

This above-described plastic lens production flow diagram permits the automated production of plastic lenses with a minimum of overhead due to the limited number of master lenses required to maintain the process, the re-use of the mold material and the minimum amount of handling required.

The prior art procedure for casting CR–39 lenses is a time-consuming operation as stated above. In order to produce optically perfect, flawless, plastic lenses which meet the exact standards of the ophthalmic profession, it is necessary that the resin (CR–39) be cured slowly. At the present time the minimum curing time employed is about 8 hours for simple lenses and this curing time may go up to as much as 36 hours for more complex lenses. The present day method of manufacture, which requires that a glass master mold be used to contain the CR–39 resin throughout the curing cycle of the resin, permits the use of a single master glass mold only once in a normal day's operation.

The following is a general analysis and comparison for the capabilities of the conventional glass, master mold technique and the technique of the present invention in the mass production of plastic lenses. Assume a production schedule of 30,000 lenses per day. In the glass master mold technique this requires the use of 30,000 glass molds. If the average cost of the master glass mold is about $2.00 per mold, $60,000 of capital must be invested for a single day's production run.

According to the preceding example of the present invention, it is possible to use a master lens to produce the thermoplastic resinous replica mold about two times per hour. On a single 8-hour shift basis, a single master lens is capable of producing 16 replica molds or on a three shift basis (24 hours), a single master lens can produce 48 replica molds in a single day. A day's production of a single shift operation, therefore, requires only about 6 percent of the total number of master glass lenses as compared to the number of master glass molds required utilizing the older techniques. If a 24-hour production schedule is adopted utilizing the present invention, the total number of master glass lenses would be a little over 2 percent of the total number of glass molds required for an equivalent production run.

Assuming the same cost for glass molds as for master lenses, the total capital outlay for the master glass lens of the present invention for an 8-hour shift is about $3,700 as opposed to the $60,000 capital outlay of the earlier technique, and a 24-hour operation schedule requires a little over a $1,200 investment in master glass lens.

Another significant advantage is that glass molds tend to deteriorate and wear out after they have been used to cure a CR–39 resin lens. This deterioration of the glass mold is due to the very high adhesion between the CR–39 resin and the ground and polished surface of the master glass molds. In the separation of the CR–39 resin lens from the glass mold, microscopic amounts of the glass which are tightly adhered to the finished lens are pulled away from the master mold, thereby gradually destroying the optical ground and polished curvature of the master glass mold. About 1 to 2 percent of the total number of of glass molds which are used each day have to be replaced due to the deterioration of the mold surface. In addition, accidental breakage or damage also increases the expense of operation of a production cycle utilizing the glass master molds.

The replica mold material of the present invention is relatively inexpensive. In addition, the material from which the replica mold is made can be remelted after use, filtered and used over and over again to produce replica molds indefinitely.

CR–39 resin is a water-clear thermosetting resin possessing a unique combination of desirable properties. It has excellent optical clarity, abrasion resistance, dimensional stability, resistance to chemicals and a high use temperature. These enumerated properties, along with other generally good physical characteristics, make CR–39 resin an excellent resin for ophthalmic and optical purposes. This resin and its method of manufacture are disclosed in U.S. Patent No. 2,384,115.

Listed below are some of the pertinent properties of cast CR–39 resin:

Light transmission ¼ inch (thickness in percent) _____ 89–92
Refractive index at 20° C.:
$N_D$ _____ 1.504
$N_C$ _____ 1.501
$N_F$ _____ 1.510
Dispersion factor:
$\frac{N_D - 1}{N_F - N_C}$ _____ 56
Hardness (Rockwell test) _____ M–95—M–100
Tensile strength, pounds per square inch____ 5,000–6,000
Compressive strength ultimate (in pounds per square inch) _____ 22,500
Abrasion resistance—the mar resistance using modified taber (times methyl methacrylate)___ 30–40
Modified falling emery test:
  (Times methyl methacrylate) _____ 9–12
  (Times glass) _____ .9–1.2

CR–39 resin upon polymerization contracts equally in all directions (volume shrinkage) until it is converted to a more or less solid gel. In the present invention, the CR–39 resin tends to be concentrated in the center of the female mold section. During the curing of the CR–39 resin, the lateral shrinkage developed in the lens appears to be negligible due to the follow-through of the mold on the lens. The apparent shrinkage occurs mostly in the thickness dimension. The fully cured CR–39 resin shrinkage in the areas in contact with the mold has been found to be almost nil while the shrinkage in the thickness dimension has been found to be about 14 percent.

The structural characteristics of the CR–39 monomer can be seen in the following diagram:

CR–39

$$O \begin{cases} CH_2CH_2-O-CO-O-CH-CH=CH_2 \\ CH_2CH_2-O-CO-O-CH_2-CH=CH_2 \end{cases}$$

CR–39 (allyl diglycol carbonate) monomer exhibits a low volatility. It contains two unsaturated aliphatic groups which are relatively stable at ordinary temperatures but which polymerize slowly on long standing or if heated to elevated temperatures. If heated in the presence of polymerization catalysts such as peroxide, CR–39 resin monomer readily converts to a thermoset polymer through polymerization of the double bonds.

The most common catalysts which can be used to polymerize CR–39 in the present invention are benzoyl peroxide or isopropyl percarbonate. If benzoyl peroxide is selected, 3 percent by weight is the amount usually used. To obtain the best optical clarity in the finished product, no matter what catalyst is used, the catalyzed CR–39 resin should be filtered. A filter aid such as Magnesol, manufactured by the Magnesol Company of Charleston, W. Va., has been found to be a suitable filter material.

The preferred catalyst of the present invention is isopropyl percarbonate because this catalyst develops an improved optical clarity in the finished CR–39 lens. This catalyst also permits a lower cure temperature cycle to be used. Isopropyl percarbonate, however, is unstable at room temperature, and in order to prevent its rapid and destructive decomposition it must be stored at a temperature not above 0° F. Because of this requirement, the transportation and handling of isopropyl percarbonate introduces problems of refrigeration. This catalyst and details of its use are disclosed in U.S. Patent No. 2,464,062.

Catalyzed CR–39 (allyl diglycol carbonate) will gel due to polymerization after about two weeks at room temperature. However, catalyzed solution may be stored for several months with little change if kept refrigerated.

Various suitable curing cycles have been developed for CR–39 (allyl diglycol carbonate) catalyzed with 3.0 percent diisopropyl peroxydicarbonate. These curing cycles vary depending upon the thickness of the CR-39 article being cured. Typical curing cycles are presented as follows:

[Diisopropyl Peroxydicarbonate Catalyst, 3.0%]

| Less than 1/16 Inch Thick | | 1/16 to 1/8 Inch Thick | | 1/8 to 3/8 Inch Thick | |
|---|---|---|---|---|---|
| Time, Hours | Temp., °F. | Time, Hours | Temp., °F. | Time, Hours | Temp., °F. |
| 0:00 | 113 | 0:00 | 115 | 0:00 | 111 |
| 0:30 | 115 | 0:50 | 117 | 1:00 | 113 |
| 1:10 | 117 | 2:05 | 118 | 2:00 | 115 |
| 2:15 | 118 | 3:45 | 122 | 2:50 | 117 |
| 3:30 | 120 | 5:05 | 126 | 4:05 | 118 |
| 4:15 | 122 | 6:15 | 129 | 5:45 | 122 |
| 5:10 | 124 | 7:20 | 132 | 7:05 | 126 |
| 5:45 | 126 | 8:05 | 136 | 8:15 | 129 |
| 6:15 | 127 | 8:45 | 140 | 9:20 | 133 |
| 6:45 | 129 | 9:25 | 145 | 10:05 | 136 |
| 7:30 | 131 | 10:00 | 147 | 10:45 | 140 |
| 8:00 | 132 | 10:30 | 149 | 11:25 | 145 |
| 8:25 | 134 | 11:00 | 151 | 12:00 | 147 |
| 8:40 | 136 | 11:30 | 153 | 12:30 | 149 |
| 9:00 | 138 | 11:50 | 154 | 13:00 | 151 |
| 9:15 | 140 | 12:10 | 156 | 13:30 | 153 |
| 9:30 | 142 | 12:30 | 158 | 13:50 | 154 |
| 9:55 | 145 | 12:50 | 162 | 14:10 | 156 |
| 10:25 | 151 | 13:10 | 171 | 14:30 | 158 |
| 10:40 | 154 | 13:40 | 176 | 14:50 | 163 |
| 11:00 | 159 | 14:10 | 185 | 15:10 | 171 |
| 11:15 | 165 | 14:30 | 194 | 15:40 | 176 |
| 11:35 | 177 | 14:50 | 221 | 16:10 | 185 |
| 11:45 | 194 | 15:00 | End of Cycle | 16:30 | 194 |
| 12:00 | End of Cycle | | | 16:50 | 221 |
| | | | | 17:00 | End of Cycle |

A typical curing cycle for CR-39 resin catalyzed with 3 percent benzoyl peroxide is as follows:

Time, hours:                           Temperature,[1] °F.

0:00 ---------------------------------- 167
    5:00 ---------------------------------- 176
    8:00 ---------------------------------- 189
   12:00 ---------------------------- End of cycle

[1] Oven temperature in an air oven.

Other details concerning curing of CR-39 resin are set forth in an article entitled, "Polymerization Control in Casting a Thermosetting Resin," which was published in vol. 47, p. 2447, December 1955 issue of Industrial and Engineering Chemistry.

The preferred mold material of the present invention is Epolene C-12. Epolene C-12 is the tradename of a low molecular weight, non-emulsifiable polyethylene resin manufactured by Eastman Chemical Products Corporation. Epolene C-12 has been widely used in wax blending applications because of its low cloud point, flexibility and resistance to thermal shock cracking. It imparts high gloss, scuff resistance and improved resistance to low temperature delamination when used as a modifier in various products.

Epolene C-12 has the following properties:

Molecular weight ------------ 3700.
Density at 25° C. ------------ 0.893 grams/cubic centimeter.
Viscosity cps. at 125° C. ------ 900.
Penetration hardness tenths millimeter 100 grams/5 sec./25°C. ------------------ 12.7.
Ring and ball softening point -- 92° C.
Linear coefficient of thermal expansion ----------------- $10.5 \times 10^{-5}$ inches per °F. up to melting temperature.

The present invention is not restricted to the preferred CR-39 and Epolene C-12 matched combination of resins disclosed in the preferred embodiment of Example I. Many other compatible combinations of thermoplastic molding materials and thermosetting resins can be devised within the scope of the present invention by one skilled in the art of resins.

In addition to CR-39 (allyl diglycol carbonate) as the castable resin, the following materials may be used. The unsaturated alcohol esters of simple polybasic acids such as diallyl phthalate, diallyl maleate, diallyl fumarate, diallyl succinate, diallyl carbonate, diallyl crotonate, diallyl benzoate, diallyl diglycolate, and any other of the many resins that will copolymerize with CR-39 resin, such as dimethallyl phthalate, glycol dimethacrylate, propylene glycol, vinyl acetate, and methyl methacrylate as indicated in U.S. 2,384,115.

These materials may be cast alone or in all proportions with CR-39 resin. Styrene may also be used but amounts in excess of about 5.0 percent by weight tend to develop clouding of the cast resin which destroys the optical clarity of the cast element. This list of substitute resins for CR-39 is not intended to be all inclusive, but merely serves to point out some of the many alternate materials suitable. Many other castable resins will become apparent to one skilled in the art.

Some thermoplastic resinous materials which can be used as mold materials are those manufactured and sold by Eastman Chemical Products Company of Kingsport, Tenn., under the trademark Epolene. These are low molecular weight polyolefins listed below by their trademark and numerical designation.

| Tradename Epolene | Ring and Ball Softening Point (°F.) | Molecular Weight (Approximate) |
|---|---|---|
| E-10 | 221 | 2,500 |
| E-11 | 214.1 | 1,500 |
| E-12 | 224.6 | 1,500 |
| E-13 | 221 | 2,500 |
| E-14 | 213.8 | 1,400 |
| N-10 | 231.8 | 2,500 |
| N-11 | 225.5 | 1,500 |
| C-10 | 217.4 | 7,000 |
| C-12 | 197.6 | 3,700 |

Certain polyethylenes manufactured by Allied Chemical Corporation of New York, N.Y., are also useful as mold materials. The table below lists several low molecular weight polyolefins having an OH or ether group at the end of their chain, by their respective trademarks.

| Trademark A-C Polyethylene Grade | Molecular Weight (Approximate) | Melting Point (°F.) |
|---|---|---|
| 6+6A | 2,000 | 219–226 |
| 7 | 2,000 | 223–230 |
| 615 | 5,000 | 224–232 |
| 617–617A | 1,500 | 210–217 |
| G-201 | 2,000 | 201–208 |

Other possible alternative mold materials, but by no means all of the possible castable wax-type resins, are:

Acrawax C—Manufactured by Glyco Chemicals Incorporated of New York, N.Y., which is a reaction product of hydrogenated castor oil and monoethanolamine having a melting point of 284° F.;

Adogen—Manufactured by Archer Daniels-Midland Company of Minneapolis, Minn., which is a stearyl amide having a melting point between 212 and 219° F.;

Carlisle Wax—Manufactured by Carlisle Chemical Works of Reading, Ohio, which is a group of amide types of waxes having melting points between 223 and 400° F.;

Halocarbon Wax—Manufactured by Union Carbide Corporation of New York, N.Y., which are saturated low-molecular weight polymers of chlorotrifluoroethylene having the general formula $-(CF_2-CFCl)_n-$.

Santowaxes—Manufactured by Monsanto Chemical Company of St. Louis, Mo., which are solid hydrocarbons (ortho, meta and para-terphenyls) having melting points between a little over room temperature and 410° F.

In addition to the preferred catalysts, isopropyl percarbonate and benzoyl peroxide, other catalysts such as acetyl peroxide, diethyl percarbonate, allyl percarbonate, acetone peroxide and ethyl peroxide may be used. Many other suitable catalysts will also become apparent to one skilled in the art depending upon the particular thermosetting resin employed to form the lens.

The overwhelming advantage of the present invention is its economics, which is primarily the result of eliminating the large inventory of master molds required. The master molds, since they are presently fabricated of glass and are optically ground and polished, are very expensive to manufacture. The very much smaller inventory of master lens patterns required in the present invention greatly reduces the capital outlay.

The second economic advantage is that the resinous mold material is relatively inexpensive and can be used over and over again to produce molds.

A third economic advantage which is also a significant advance over the prior art is the elimination of the flexible gasket between the mold halves. The gasket was previously required to allow for follow-through of the rigid glass mold on the curing plastic lens. This problem of follow-through, which has always perplexed the manufacturers of plastic lenses, has now been solved.

The present invention is timely because the use of plastic lenses is on the increase. Plastic lenses are desirable because they are essentially unbreakable and shatterproof. They are thus suitable for children's glasses and for safety lenses. Plastic lenses of comparable prescription are much lighter than conventional glass lenses and so are more comfortable to wear. This lighter weight of plastic lenses is especially advantageous for those individuals who must wear cataract or similar lenses which, when made out of glass, are quite thick and heavy, making them uncomfortable to wear.

The use of CR–39 resin has further increased the popularity of plastic lenses because CR–39 resin exhibits a very high scratch resistance.

The present method of producing plastic optical and ophthalmic lenses is capable of producing single, bifocal, trifocal, or any other multiple compound lens. Any lens which can be fabricated out of glass can also be fabricated of plastic in accordance with the method herein disclosed.

It is also within the scope of the present invention to produce tinted plastic lenses with or without a prescription. One of the desirable properties of the preferred resin CR–39 is that it readily takes a colored dye. The method of producing a plastic colored lens requires only the additional step of dipping the plastic lens into a suitable dye of the desired color for a few seconds to cause diffusion of the color into the surface of the lens.

The method disclosed in the present invention also is not limited merely to the manufacture of plastic optical or ophthalmic lenses. The method can be readily adapted to the manufacture of camera lenses, binocular prisms, contact lenses or any other article which may be made of plastic.

While the present invention has been described with respect to a particular method of manufacture, various modifications within the scope of the present invention can be readily devised. The scope of the present invention should only be limited by the language of the appended claims.

I claim:
1. A method of producing thermosetting resinous lenses which comprises,
   producing a two-part replica mold of a master lens pattern by casting a thermoplastic resinous material over two master lens surfaces,
   separating the resinous replica mold section from the master lens pattern,
   introducing a thermosetting resin into the replica mold,
   heating the filled mold above the curing temperature of the thermosetting resin but below the softening point of the thermoplastic mold to cure the thermosetting resinous material therein, and
   separating the mold from the cured plastic lens.
2. A method of producing lenses which comprises
   producing a replica mold of two master lens surfaces by casting a thermoplastic resinous material about the master lens surfaces in two separate casting steps,
   separating the resinous replica mold from the master lens surfaces,
   introducing a measured amount of a heat curable thermosetting resin into the replica mold, said resin being characterized by a volume shrinkage upon curing,
   heating the filled mold above the curing temperature of the thermosetting resin but below the softening point of the thermoplastic mold to cure the thermosetting reisn, said resin adhering to the mold surfaces and said mold softening during the heating to permit the mold surfaces in contact with the curing resin to follow through with the resin shrinkage during curing, and
   separating the mold from the cured resinous lens.
3. A method of producing resinous lenses which comprises,
   producing a two-part replica mold of two master lens surfaces by casting a molten thermoplastic resinous material about the master lens surfaces in two separate steps,
   separating the mold sections from the master lens surfaces,
   introducing a measured amount of thermosetting resin into one section of the mold and enclosing the thermosetting resin with the other mold section,
   heating the filled mold above the curing temperature of the thermosetting resin but below the softening point of the thermoplastic mold to cure the thermosetting resin therein, and
   separating the mold sections from the cured lens.
4. A method of producing thermosetting resinous lenses comprising,
   producing a two-part thermoplastic resinous replica mold of two master lens surfaces in two steps, in which one step is casting on a master lens curvature the desired concave master lens curvature in one part of the two-part replica mold and the other step is separately casting on a master lens curvature the desired convex master lens curvature in the other part,
   cooling the two cast mold parts,
   removing the master convex and concave curvatures from the two mold parts,
   introducing a measured amount of a liquid, curable, thermosetting resin sufficient to produce a finished lens into the depression of the mold part forming the convex curvature of the lens,
   positioning the other part of the mold above the resin filled mold part in touching relation with the thermosetting resin,
   heating the filled two-part mold above the curing temperature of the thermosetting resin but below the softening point of the thermoplastic mold to cure the resin therein,
   cooling the filled two-part replica mold containing the cured resin therein, and
   separating the mold from the cured lens.
5. A method of producing a plurality of thermosetting resinous lenses which comprises,
   producing a two-part thermoplastic resinous replica mold of a master lens in two steps, in which one step is casting the desired concave lens curvature in one part of the two-part mold and another step is separately casting on a master lens curvature the desired convex lens curvature in the other part,
   cooling the two cast mold sections,
   separating the master curvatures from the cast mold sections,
   introducing a measured amount of a liquid curable, thermosetting resin sufficient to produce a finished lens into the depression of the mold part forming the convex curvature of the lens, said resin being characterized by a volume shrinkage upon curing, positioning the other part of the mold above the resin filled mold part in touching relation with the thermosetting resin, heating the filled two-part mold above the curing temperature of the thermosetting resin but below the softening point of the thermoplastic mold to cure the thermosetting resin therein, said resin adhering to the mold surfaces and said mold softening during the heating to permit the mold surfaces in contact with the curing resin to follow through with the resin shrinkage during curing, cooling the replica mold having the cured lens therein, separating the mold and removing the cured finished lens, melting the mold sections, and producing another thermosetting resinous lens according to the preceding steps.

6. The method of claim 1 wherein the thermoplastic resinous material cast about the master pattern has a melting temperature of 10° F. to 50° F. above the curing temperature of the thermosetting resinous material.

7. The method of claim 1 wherein the thermosetting resinous material cast into the replica mold comprises allyl diglycol carbonate.

8. The method of claim 1 wherein the thermoplastic resinous material cast about the master pattern is a low molecular weight polyolefin.

9. The method of claim 8 wherein the polyolefin is a polyethylene resin having a molecular weight of from about 1400 to about 3700.

References Cited

UNITED STATES PATENTS 2,965,946  12/1960  Sweet _____ 264—337

FOREIGN PATENTS 916,377  1/1963  Great Britain.
666,858  2/1952  Great Britain.

JULIUS FROME, *Primary Examiner.*

A. H. KOECKERT, *Assistant Examiner.*

U.S. Cl. X.R.

18—4, 39, 47; 264—37, 78, 221, 238, 297, 317, 337